B. D. MARKS.

BOTTLE WRAPPER.

No. 9,797. Reissued July 12, 1881.

Witnesses.
W. W. Mortimer.
A. C. Kiskadden.

Inventor.
B. D. Marks,
per
F. A. Lehmann,
Atty.

N. PETERS, Photo-Lithographer, Washington, D. C.

UNITED STATES PATENT OFFICE.

BENNETT D. MARKS, OF LOUISVILLE, KENTUCKY.

BOTTLE-WRAPPER.

SPECIFICATION forming part of Reissued Letters Patent No. 9,797, dated July 12, 1881.

Original No. 218,297, dated August 5, 1879. Application for reissue filed May 6, 1881.

*To all whom it may concern:*

Be it known that I, BENNETT D. MARKS, of Louisville, in the county of Jefferson and State of Kentucky, have invented certain new and useful Improvements in Bottle-Wrappers; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates to an improvement in bottle-wrappers; and it consists, first, in placing the veneer out of which the wrapper is formed around the bottle in such a manner that the grain of the wood will run lengthwise with the bottle, whereby the bottle will be much more perfectly protected; second, in the combination of a bottle-wrapper made from a veneer of wood in which the grain of the wood runs lengthwise with the bottle with suitable retaining bands or ties, whereby the wrapper is secured to the bottle, as will be more fully described hereinafter.

The object of my invention is to produce a bottle-wrapper which will be much cheaper and more easily applied than wrappers made of straw and other similar materials, and which, in case one of the bottles should be broken and its contents run out into the box or case, will not absorb and retain the contents in such a manner as to produce unpleasant odors or smells.

Figure 1:
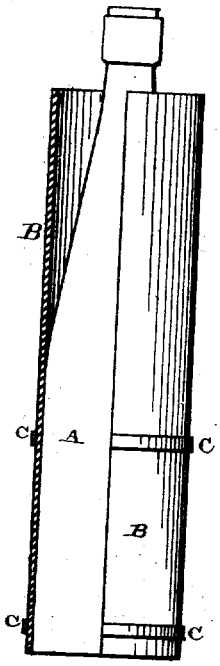
Figure 2:
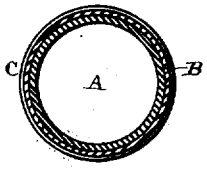
Figure 3:
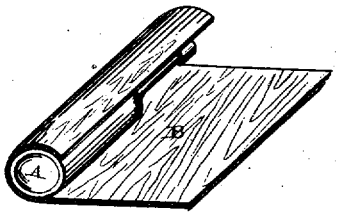

Figure 1 represents a side elevation of my invention, partly in section. Fig. 2 is a horizontal section of the bottle of the wrapper. Fig. 3 is a perspective of a bottle, showing the wrapper just about to be attached to it.

A represents a bottle; and B the wrapper, which is formed from a thin sheet or veneer of wood, and which wrapper is secured to the outside of the bottle, as shown, by means of suitable bands or ties C. The grain of the wood of the wrapper should run lengthwise to the bottle, so that the transverse flexibility of the sheet may be availed of to enable it to take the curvature of the bottle. The grain is made to run lengthwise with the bottle because the ends of the wrapper can then be compressed together without having to gore or slit them, whereas if the wood has the grain to run in the opposite direction the ends must be gored. The rigidity of the sheet lengthwise of the grain is sufficient to diffuse the force of the blow, so that there is little danger of cracking the glass. The bands C also constitute an element of safety, because they act as springs to prevent the dangerous concussion of bottles against each other.

Having thus described my invention, I claim—

1. A bottle-wrapper composed of the wooden sheet B and elastic retaining-bands C, substantially as shown.

2. A bottle-wrapper composed of the wooden sheet B, having its grain run lengthwise with the bottle, in combination with elastic or compressible retaining-bands, substantially as described.

In testimony whereof I affix my signature in presence of two witnesses.

B. D. MARKS.

Witnesses:
A. C. KISKADDEN,
F. A. LEHMANN.